US012799777B2

(12) United States Patent
Miyagawa et al.

(10) Patent No.: US 12,799,777 B2
(45) Date of Patent: Nov. 17, 2026

(54) KEY CYLINDER DEVICE FOR VEHICLE DOOR

(71) Applicant: Minebea AccessSolutions Inc., Miyazaki (JP)

(72) Inventors: Takuya Miyagawa, Miyazaki (JP); Yutaro Kuratomi, Miyazaki (JP); Hikaru Hiejima, Miyazaki (JP)

(73) Assignee: MINEBEA ACCESSSOLUTIONS INC., Miyazaki (JP)

( * ) Notice: Subject to any disclaimer, the term of this patent is extended or adjusted under 35 U.S.C. 154(b) by 0 days.

(21) Appl. No.: 19/069,367

(22) Filed: Mar. 4, 2025

(65) Prior Publication Data

US 2025/0297501 A1 Sep. 25, 2025

(30) Foreign Application Priority Data

Mar. 21, 2024 (JP) ................................. 2024-044977

(51) Int. Cl.
*E05B 81/50* (2014.01)
*E05B 79/20* (2014.01)
(Continued)

(52) U.S. Cl.
CPC .............. *E05B 81/50* (2013.01); *E05B 79/20* (2013.01); *E05B 81/24* (2013.01); *E05B 81/30* (2013.01);
(Continued)

(58) Field of Classification Search
CPC ........ E05B 53/005; E05B 79/10; E05B 79/20; E05B 79/22; E05B 81/16; E05B 81/24;
(Continued)

(56) References Cited

U.S. PATENT DOCUMENTS 4,426,858 A * 1/1984 Interrante ........... E05B 17/2092 292/225
5,566,562 A * 10/1996 Fujii ....................... E05B 17/04 70/276
(Continued)

FOREIGN PATENT DOCUMENTS

CN 106246013 A 12/2016
DE 102008014638 B4 10/2008
(Continued)

OTHER PUBLICATIONS

Extended European Search Report for corresponding European Application No. 25160329.6 dated Aug. 14, 2025.

*Primary Examiner* — Christopher J Boswell
(74) *Attorney, Agent, or Firm* — Chrisman Gallo Tochtrop LLC

(57) ABSTRACT

A key cylinder device includes: a key cylinder that is turnable between an operation position at which a door lock device can be switched and a non-operation position at which the door lock device cannot be switched; a pulling member that is moved in a first direction by turning of the key cylinder from the non-operation position to the operation position and is moved in a second direction by the turning of the key cylinder from the operation position to the non-operation position; and a connecting mechanism for connecting the pulling member to the door lock device. In the key cylinder, a first biasing member that biases the key cylinder from the operation position to the non-operation position is disposed. In the connecting mechanism, a second biasing member that biases the pulling member to move in the second direction is disposed.

12 Claims, 6 Drawing Sheets

(51) Int. Cl.

| | |
|---|---|
| ***E05B 81/24*** | (2014.01) |
| ***E05B 81/30*** | (2014.01) |
| ***E05B 81/90*** | (2014.01) |
| ***E05B 85/06*** | (2014.01) |
| *E05B 53/00* | (2006.01) |

(52) U.S. Cl.
CPC ............ *E05B 81/90* (2013.01); *E05B 53/005* (2013.01); *E05B 85/06* (2013.01)

(58) Field of Classification Search
CPC .......... E05B 81/25; E05B 81/26; E05B 81/30; E05B 81/50; E05B 83/36; E05B 85/06
See application file for complete search history.

(56) References Cited

U.S. PATENT DOCUMENTS

| | | | | |
|---|---|---|---|---|
| 5,638,712 | A * | 6/1997 | Kuroda | B60R 25/04 70/264 |
| 8,756,964 | B2 * | 6/2014 | Yano | B62H 5/00 70/264 |
| 8,925,361 | B2 * | 1/2015 | Granny | E05B 17/2092 70/451 |
| 9,249,605 | B2 * | 2/2016 | Yamagata | E05B 85/02 |
| 9,938,755 | B2 * | 4/2018 | Taurasi | E05B 81/06 |
| 10,392,838 | B2 * | 8/2019 | Tomaszewski | E05B 81/90 |
| 11,156,023 | B2 * | 10/2021 | Iwata | E05B 79/12 |
| 11,421,454 | B2 * | 8/2022 | Cumbo | E05B 85/01 |
| 11,814,883 | B2 * | 11/2023 | Nielsen | E05B 77/44 |
| 2013/0283869 | A1 | 10/2013 | Yano | |
| 2016/0362916 | A1 | 12/2016 | Tomaszewski | |
| 2018/0355642 | A1 | 12/2018 | Cumbo et al. | |
| 2019/0352947 | A1 | 11/2019 | Tomaszewski | |
| 2020/0131812 | A1 | 4/2020 | Slovesko | |

FOREIGN PATENT DOCUMENTS

| | | | |
|---|---|---|---|
| FR | 2721646 | A1 | 12/1995 |
| JP | H05-25965 | A | 2/1993 |
| WO | 2012086252 | A1 | 6/2012 |
| WO | 2020083357 | A1 | 4/2020 |

* cited by examiner

KEY CYLINDER DEVICE FOR VEHICLE DOOR

CROSS REFERENCE TO RELATED APPLICATION

This application claims benefit of priority to Japanese Patent Application 2024-044977, filed on Mar. 21, 2024, the entire content of which is incorporated herein by reference.

BACKGROUND

Technical Field

The present disclosure relates to a coil component.

Background Art

A key cylinder device for switching a door lock device disposed on a door of a vehicle from a locked state to an unlocked state is known. When the door lock device is in the unlocked state, the door can be opened by operation of a handle disposed on the door. When the door lock device is in the locked state, the door cannot be opened even by operating the handle.

The key cylinder device disclosed in JP H5-25965 A includes a cable for transmitting the operating force of the key cylinder to the door lock device and is attached to the door at a position away from the door lock device. One end of a wire (pulling member) provided in the cable is connected to a lever provided in the key cylinder. The other end of the wire is connected to the door lock device. This causes the operating force of the key cylinder by the key operation to be transmitted to the door lock device via the lever and the wire and causes the door lock device to switch from the locked state to the unlocked state. A spring for returning the key cylinder to an initial position (non-operation position) before operation is disposed in the key cylinder.

SUMMARY

Depending on the arrangement of the door lock device and the key cylinder device with respect to the door, the total length of the cable may be longer, or the cable may be routed in a curved manner. In this case, since the resistance between the tube included in the cable and the pulling member including the wire increases, the biasing force of the spring disposed in the key cylinder may not be able to return the key cylinder including the pulling member to the non-operation position.

The present invention relates to a key cylinder device for a vehicle door connected to a door lock device via a pulling member, and an object of the present invention is to improve a returning property of a key cylinder including the pulling member to a non-operation position.

The present invention provides a key cylinder device for a vehicle door including: a key cylinder that is turnable between an operation position at which a door lock device can be switched to a locked state or an unlocked state and a non-operation position at which the door lock device cannot be switched; a pulling member that is moved in a first direction by turning of the key cylinder from the non-operation position to the operation position and is moved in a second direction opposite to the first direction by the turning of the key cylinder from the operation position to the non-operation position; and a connecting mechanism for connecting the pulling member to the door lock device. In the key cylinder, a first biasing member that biases the key cylinder from the operation position to the non-operation position is disposed, In the connecting mechanism, a second biasing member that biases the pulling member to move in the second direction is disposed.

Since the key cylinder is connected to the door lock device via the pulling member and the connecting mechanism, the key cylinder can be disposed at a desired position of the door. In the key cylinder, a first biasing member that biases the key cylinder from the operation position to the non-operation position is disposed. In the connecting mechanism, a second biasing member that biases the pulling member to move in the second direction is disposed. Therefore, even increasing the resistance between the pulling member and the tube allows the key cylinder including the pulling member to reliably return to the non-operation position.

The present invention relates to a key cylinder device for a vehicle door connected to a door lock device via a pulling member and can improve a returning property of a key cylinder including the pulling member to a non-operation position.

DETAILED DESCRIPTION

Hereinafter, an embodiment of the present invention will be described with reference to the drawings.

Figure 1:
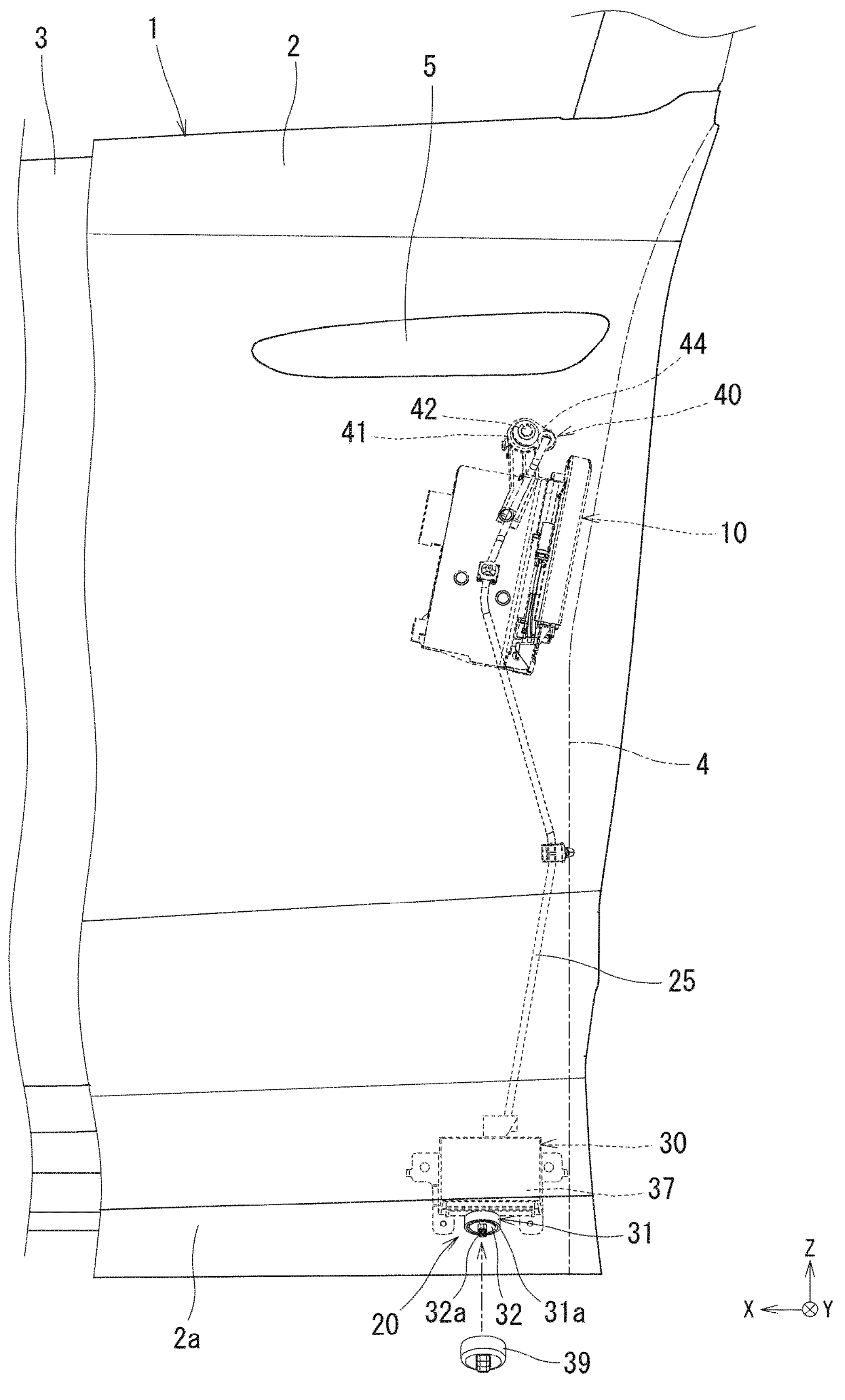
FIG. 1 is a front view of a door of a vehicle using a key cylinder device according to an embodiment of the present invention.
Figure 2:
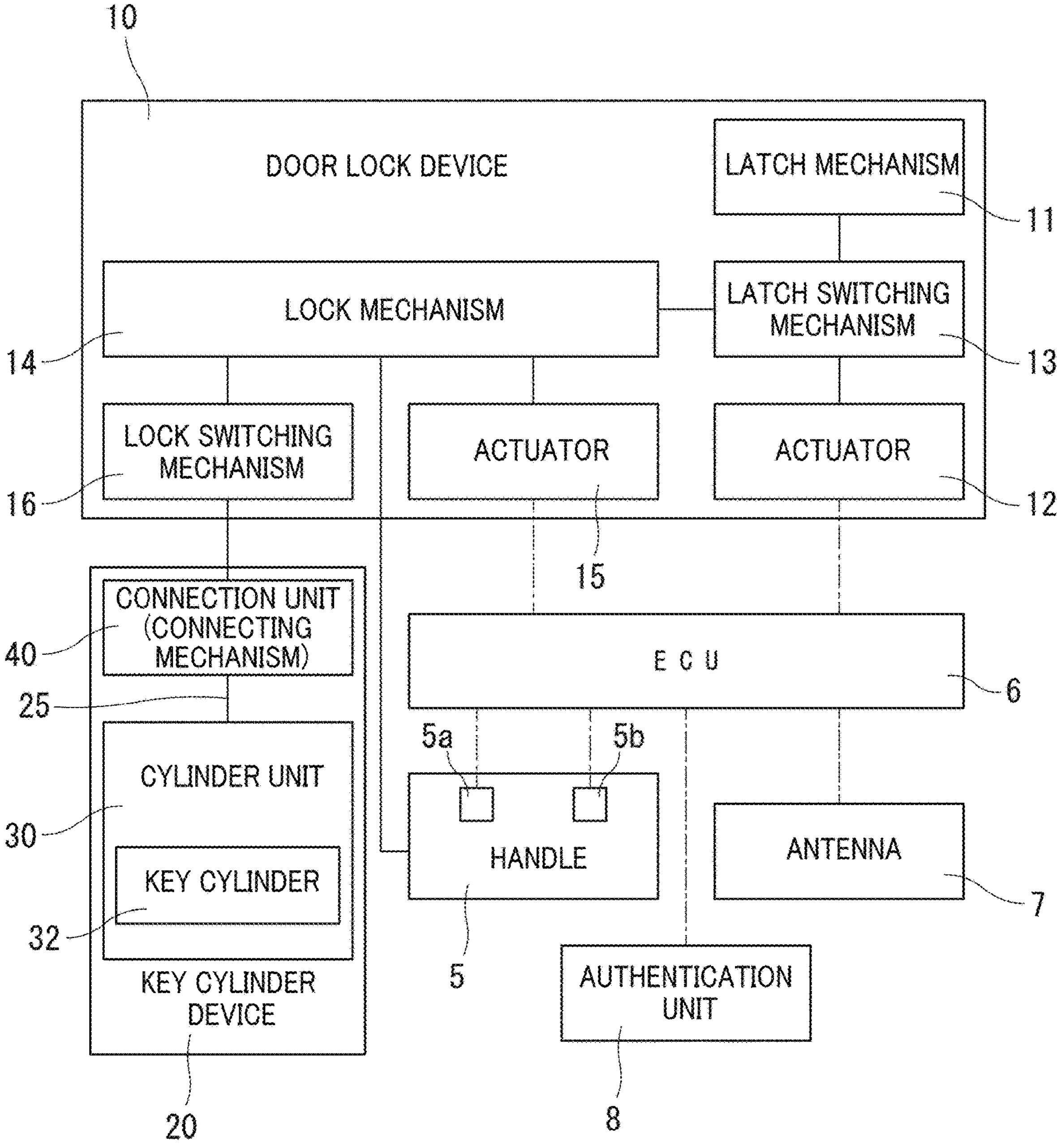
FIG. 2 is a block diagram illustrating a relationship among a door lock device, a handle and the key cylinder device of in FIG. 1.

Referring to FIGS. 1 and 2, a key cylinder device 20 according to an embodiment of the present invention is attached to a door 1 of a vehicle, and switches a door lock device 10 attached to the same door 1 from a locked state to an unlocked state to allow the door 1 to be opened by an operation of a handle 5.

The key cylinder device 20 of the present embodiment is used for a left side door whose hinge shaft extends in the vehicle height direction. However, the key cylinder device 20 may be used for a right side door, a slide door, or a back door.

An X direction in the accompanying drawings is a vehicle length direction, a direction indicated by an arrow is a front side, and a direction opposite to the arrow is a rear side. A Y direction is a vehicle width direction, and a direction indicated by an arrow is an inner side (vehicle interior side), and a direction opposite to the arrow is an outer side (vehicle exterior side). A Z direction is a vehicle height direction, and a direction indicated by an arrow is an upper side, and a direction opposite to the arrow is a lower side.

Referring to FIGS. 1 and 2, the key cylinder device 20 is mechanically connected to the door lock device 10. The door lock device 10 is communicably connected to an electronic control unit (ECU) 6 mounted on the vehicle. An antenna 7 for performing wireless communication with an electronic key (not illustrated) carried by the user and an authentication unit 8 for performing key authentication are connected to the ECU 6.

The ECU 6 includes a calculation unit, a storage unit, and a communication unit (not illustrated), reads a program stored in advance in the storage unit, and executes information processing according to steps instructed by the program. When the key authentication by the authentication unit 8 is established, the ECU 6 electrically operates the door lock device 10 based on an input signal from the handle 5. On the other hand, when the key authentication by the authentication unit 8 is not established, the ECU 6 does not operate the door lock device 10 even if the signal is input from the handle 5.

Describing the outline of a door latch device 10, the door lock device 10 is disposed along an end panel 4 in a space defined by an outer panel 2, an inner panel 3, and an end panel 4 of the door 1. The door lock device 10 includes a latch mechanism 11, an actuator 12, a latch switching mechanism 13, a lock mechanism 14, an actuator 15, and a lock switching mechanism 16.

The latch mechanism 11 includes a fork and a claw and can be switched between a latched state and an unlatched state. In the latched state, the fork holds the striker of the vehicle body and holds the door 1 in the closed state. In the unlatched state, the fork releases the striker, allowing the door 1 to be opened.

The lock mechanism 14 is configured by a plurality of levers or the like and can be switched between an unlocked state and a locked state. In the unlocked state, the latch mechanism 11 can be switched from the latched state to the unlatched state via the latch switching mechanism 13. In the locked state, the latch mechanism 11 can be switched from the latched state to the unlatched state via the latch switching mechanism 13.

The latch mechanism 11 is switched from the unlatched state to the latched state by the entry of the striker into the fork when the door 1 in the open state is closed. The switching of the latch mechanism 11 from the latched state to the unlatched state from the outside of the vehicle is performed by ECU 6 electrically via the latch switching mechanism 13 in response to a signal input from a switch 5*a* that has detected the normal opening operation of the handle 5 in a normal state in which the actuator 12 can be operated. On the other hand, in an emergency state in which the actuator 12 cannot be operated, the switching of the latch mechanism 11 from the latched state to the unlatched state from the outside of the vehicle is manually performed via the lock mechanism 14 and the latch switching mechanism 13 by an emergency opening operation of the handle 5 by the user.

The switching (locking) of the lock mechanism 14 from the unlocked state to the locked state from the outside of the vehicle is performed by the ECU 6 electrically in response to a signal input from a switch 5*b* that has detected the locking operation of the handle 5 in a normal state in which the actuator 15 can be operated. The switching (unlocking) of the lock mechanism 14 from the locked state to the unlocked state from the outside of the vehicle is normally performed by the ECU 6 electrically by a signal input from the switch 5*a* that has detected the normal opening operation of the handle 5. On the other hand, in an emergency state in which the actuator 15 cannot be operated, the switching of the lock mechanism 14 from the locked state to the unlocked state from the outside of the vehicle is manually performed via the lock switching mechanism 16 by an emergency operation (unlock operation) of the key cylinder device 20 by the user.

As described above, the key cylinder device 20 is not used in a normal state in which the actuator 15 can be operated. Therefore, the key cylinder 32 included in the key cylinder device 20 is disposed at the lower end portion 2*a* of the outer panel 2 below the user's eye line so as not to impair the designability of the door 1. The lower end portion 2*a* is a region on the lower side of a half of the total height of the outer panel 2, and is a portion inclined to the inner side in the vehicle width direction toward the lower side.

Hereinafter, the key cylinder device 20 of the present embodiment will be specifically described.

Figure 3:
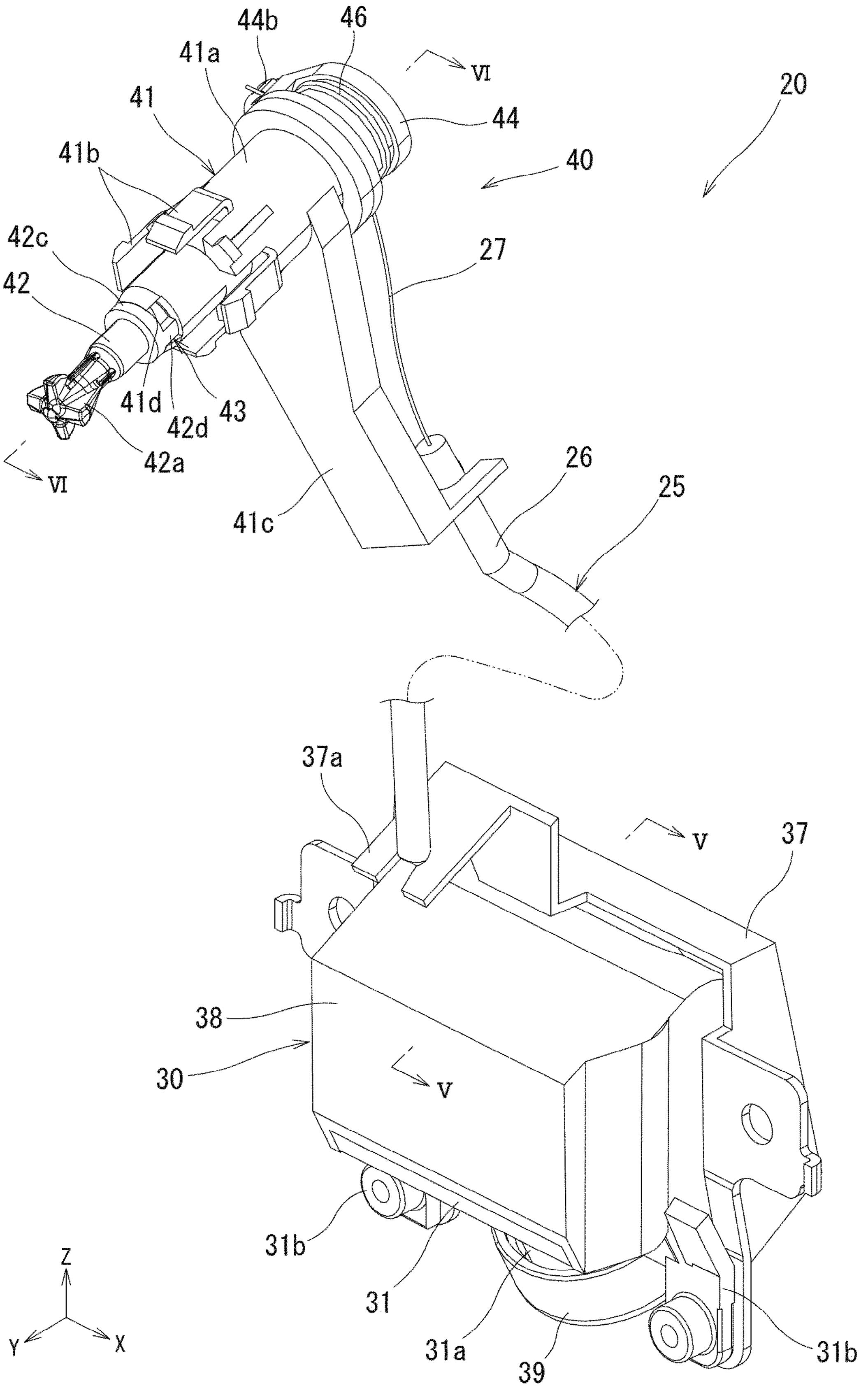
FIG. 3 is a rear perspective view of the key cylinder device.
Figure 4:
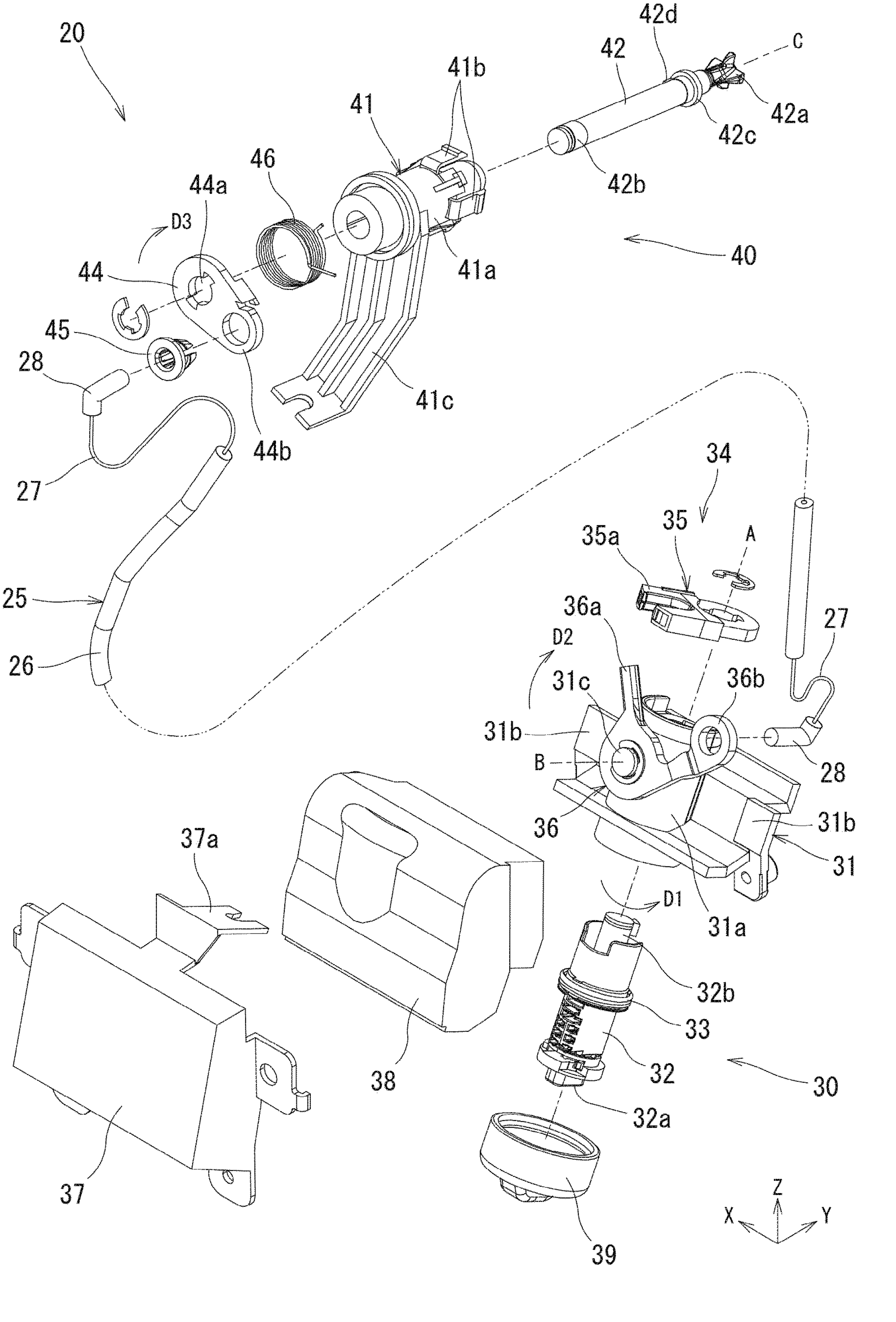
FIG. 4 is an exploded perspective view of the key cylinder device.

Referring to FIGS. 1, 3, and 4, the key cylinder device 20 includes a cylinder unit (cylinder mechanism) 30, a connection unit (connecting mechanism) 40, and a cable 25 that mechanically connects the cylinder unit 30 and the connection unit 40.

In the key cylinder device 20, a portion other than the distal end of the key cylinder 32 included in the cylinder unit 30 is disposed in the space between the outer panel 2 and the inner panel 3 in the door 1 and is invisible from the outside of the door 1. In the key cylinder device 20, only the distal end of the key cylinder 32 can be exposed to the outside of the vehicle. At a normal time, the distal end of the key cylinder 32 is preferably covered by the decorative member of the door 1 and exposed by the operation by the user.

Configuration of Cable

Referring to FIGS. 1, 3, and 4, the cable 25 includes a tube 26 and a wire (pulling member) 27 each having flexibility. The wire 27 is a transmission member for transmitting the operating force of the key cylinder 32 to the door lock device 10 via the connection unit 40. The wire 27 is movably inserted into the tube 26, and can advance and retract in conjunction with the turning of the key cylinder 32. Wire ends 28 are respectively fixed to both ends of the wire 27. Of the pair of wire ends 28, one located at the lower end is connected to the cylinder unit 30, and the other located at the upper end is connected to the connection unit 40.

Configuration of Cylinder Unit

Figure 5:
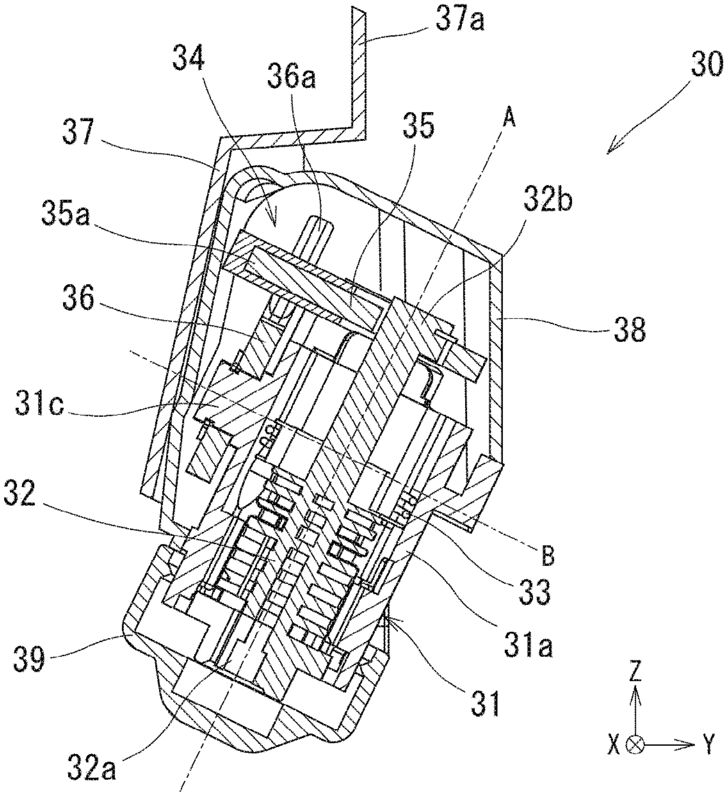
FIG. 5 is a cross-sectional view taken along line V-V of FIG. 3.

Referring to FIGS. 3 to 5, the cylinder unit 30 is a configuration for unlocking the door lock device 10 from the outside of the door 1 illustrated in FIG. 1. The cylinder unit 30 includes a casing 31, a key cylinder 32, a turning mechanism 34, an anti-theft cover 37, a waterproof cover 38, and a waterproof cap 39. Among them, the turning mechanism 34 includes a driving lever 35 and a driven lever (turning member) 36.

The casing 31 is a configuration for attaching the cylinder unit 30 to the outer panel 2 illustrated in FIG. 1. The casing 31 includes a main body portion 31*a*, an attachment portion 31*b*, and a shaft portion 31*c*.

The body portion 31*a* has a cylindrical shape and turnably supports the key cylinder 32 therein. An axis line A of the body portion 31*a* is inclined to the outer side in the vehicle width direction toward the lower side, but extends in the vehicle height direction as a whole. The attachment portion 31*b* is a configuration for attaching to the outer panel 2 illustrated in FIG. 1, and protrudes toward both sides in the vehicle length direction from the body portion 31*a*. The shaft portion 31*c* is a configuration for attaching the driven lever 36 and protrudes to the outer side in the vehicle width direction from the main body portion 31*a*. The axis line B of the shaft portion 31*c* extends in a direction orthogonal to the axis line A of the main body portion 31*a*.

The key cylinder 32 includes a key hole 32*a* into which a regular mechanical key (not illustrated) can be inserted. The key cylinder 32 is turnably attached to the main body portion 31*a* of the casing 31 and is disposed at the lower end portion 2*a* of the outer panel 2 illustrated in FIG. 1 so that the key hole 32*a* is directed to the lower side (road surface).

The key cylinder 32 is turnable between an initial position (non-operation position) illustrated in FIGS. 1 and 5 and an unlocking position (operation position) turned from the initial position by an angle defined in a direction D1 (clockwise in FIG. 1) illustrated in FIG. 4 by an operation of the mechanical key. When the key cylinder 32 is turned to the initial position, the lock mechanism 14 illustrated in FIG. 2 cannot be switched. When the key cylinder 32 is turned from the initial position to the unlocking position, the lock mechanism 14 is switched from the locked state to the unlocked state via the lock switching mechanism 16 illustrated in FIG. 2. Note that the transmission of the operating force of the key cylinder 32 to the lock mechanism 14 illustrated in FIG. 2 will be described in detail later.

The key cylinder 32 is biased from the unlocking position to the initial position by a spring (first biasing member) 33. One end of the spring 33 is locked to the casing 31, and the other end of the spring 33 is locked to the key cylinder 32.

The driving lever 35 is integrally turned around the axis line A in the same direction as the key cylinder 32 by the turning of the key cylinder 32. Specifically, the driving lever 35 is attached to the upper end portion 32*b* of the key cylinder 32 so as not to be relatively movable in both the axial direction and the circumferential direction of the key cylinder 32. The rotation axis (first rotation axis) of the driving lever 35 coincides with the axis line A of the casing 31 and the rotation axis of the key cylinder 32. The driving lever 35 is provided with an engagement portion 35*a* for engaging the driven lever 36 so as to project out to the outer side in the vehicle width direction.

The driven lever 36 is disposed adjacent to the driving lever 35 and is turnable in conjunction with the turning of the driving lever 35. Specifically, the driven lever 36 is disposed on the outer side in the vehicle width direction of the casing 31 and attached to the shaft portion 31*c*. This allows the driven lever 36 to turn about the axis line B of the shaft portion 31*c* that is a second rotation axis extending in a direction orthogonal to the axis line A of the casing 31 that is a first rotation axis of the driving lever 35.

The driven lever 36 is provided with a to-be-engaged portion 36*a* to be engaged with the engagement portion 35*a* so as to project out to the upper side toward the driving lever 35. This causes, when unlocking the key cylinder 32 in the direction D1 illustrated in FIG. 4, the driven lever 36 to turn in the direction D2 by integrally turning the driving lever 35 in the same direction D1. The driven lever 36 is provided with a wire connecting portion 36*b* in order to pull the wire 27 downward by the turning in the direction D2. The wire connecting portion 36*b* includes a hole for connecting a wire end 28 at a lower end of the wire 27. The wire connecting portion 36*b* protrudes to the rear side in the vehicle length direction so as to be turned downward by the turning of the driven lever 36 in the direction D2.

The anti-theft cover 37 is configured to prevent a third party from illegally operating the driving lever 35, the driven lever 36, and the wire 27. The anti-theft cover 37 is attached to the outer side in the vehicle width direction with respect to the casing 31 and covers the casing 31 including the key cylinder 32, the driving lever 35, the driven lever 36, and the lower end of the wire 27. This causes a member intended for picking to suppress the driving lever 35, the driven lever 36, and the wire 27 from being directly operated. The anti-theft cover 37 is provided with a holding portion 37*a* that positions and holds a tube end (not illustrated) attached to an end of the tube 26.

The waterproof cover 38 is provided to prevent water from entering the casing 31. The waterproof cover 38 covers the main body portion 31*a* of the casing 31 including the key cylinder 32, the driving lever 35, the driven lever 36, and the lower end of the wire 27. Thus, water entering the door 1 from between the outer panel 2 and the inner panel 3 is prevented from adhering to the driving lever 35, the driven lever 36, and the lower end of the wire 27.

The waterproof cap 39 is a configuration for preventing water from entering the key cylinder 32 through the key hole 32*a*. The waterproof cap 39 is a cylindrical body with one end opened and the other end closed, and is detachably attached to the outer end portion of the body portion 31*a* of the casing 31 including the key cylinder 32.

Configuration of Connection Unit

Figure 6:
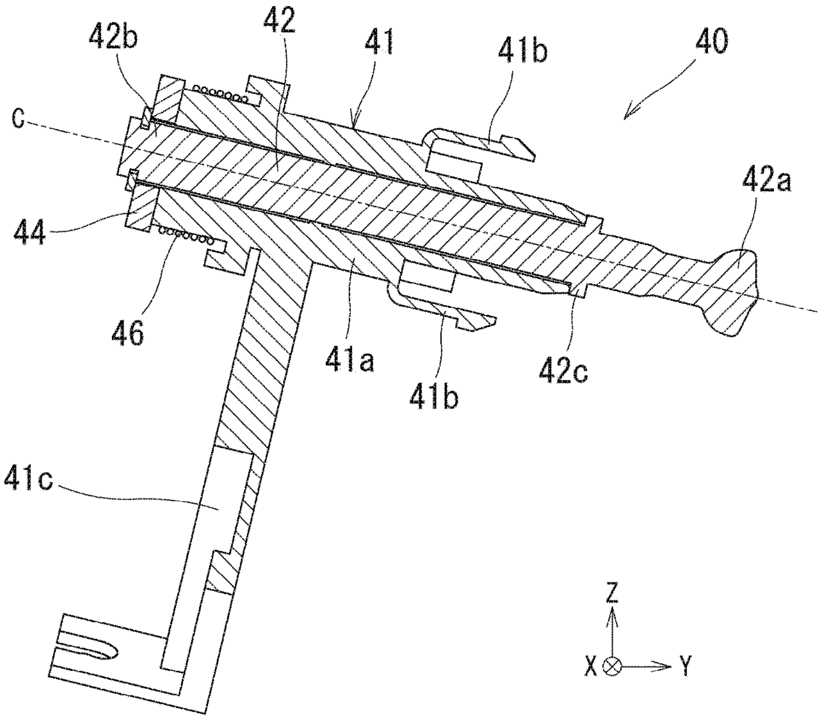
FIG. 6 is a cross-sectional view taken along line VI-VI of FIG. 3.

Referring to FIGS. 3, 4, and 6, the connection unit 40 is a configuration for connecting the cylinder unit 30 to the door lock device 10 by way of the wire 27. In the door 1 illustrated in FIG. 1, the connection unit 40 is disposed above the cylinder unit 30 with an interval, and is attached at a height position equivalent to that of the door lock device 10. The connection unit 40 includes a support member 41, a rod (connecting member) 42, and a connection lever 44.

The support member 41 is a configuration for turnably supporting the rod 42, and attaching the connection lever 44 including the rod 42 to the attachment panel 3*a* (see FIG. 7) joined to the inner panel 3 illustrated in FIG. 1. The support member 41 includes a body portion 41*a*, an attachment piece 41*b*, and a holding portion 41*c*.

The body portion 41*a* has a cylindrical shape and turnably supports the rod 42 therein. The axis line C of the main body portion 41*a* is inclined downward toward the inner side in the vehicle width direction but extends in the vehicle width direction as a whole. The attachment piece 41*b* is a configuration for attaching to the attachment panel 3*a* illustrated in FIG. 7, and a plurality of attachment pieces are provided at an end portion on the inner side in the vehicle width direction of the main body portion 41*a* at intervals in the circumferential direction. The holding portion 41*c* is configured to position and hold a tube end (not illustrated) attached to an end of the tube 26, and protrudes to the lower side from the main body portion 41*a* toward the connection unit 40.

Figure 7:
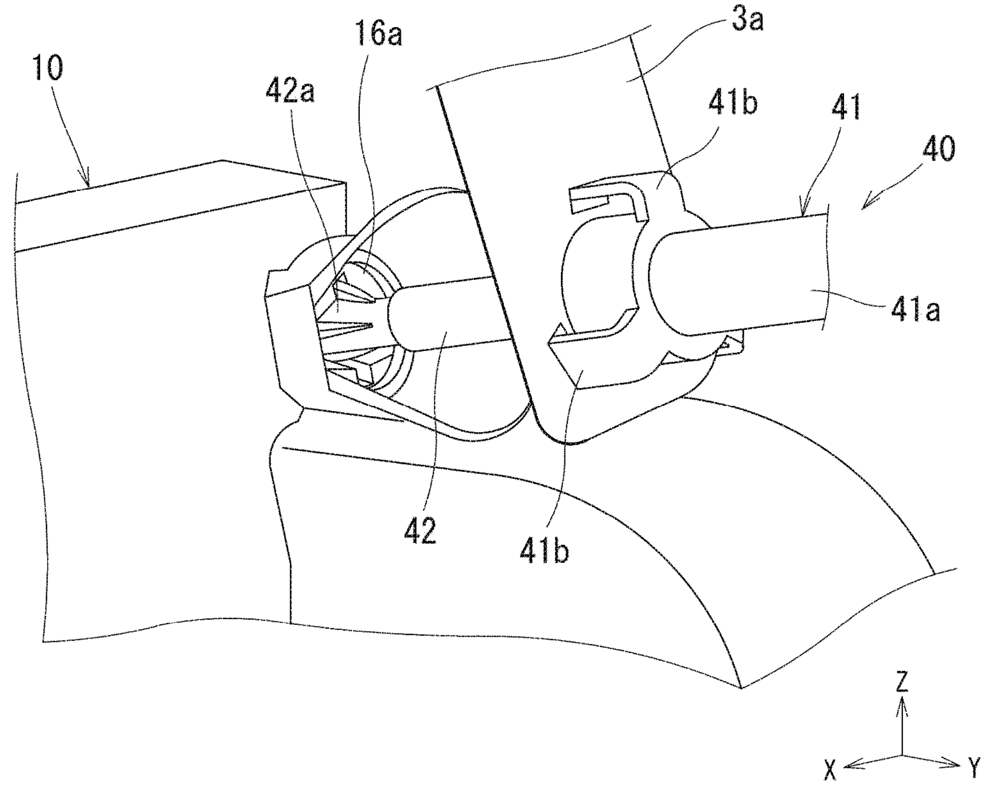
FIG. 7 is a perspective view illustrating a connection state of a rod to the door lock device.

Referring to FIGS. 3, 4, and 7, the rod 42 is a configuration for connecting to a connection receiving portion 16*a* similar to the known connection receiving portion provided in the door lock device 10. The rod 42 has a rod shape and is attached to the main body portion 41*a* of the support member 41 so as to be allowed to turn about the axis line C. The axis line of the rod 42 coincides with the axis line C of the main body portion 41*a* due to the attachment to the support member 41. The entire length of the rod 42 is longer than the entire length of the body portion 41*a*. Both ends of the rod 42 protrude from both ends of the body portion 41*a*.

A connecting portion 42*a* is provided at an end portion on the inner side in the vehicle width direction of the rod 42. The connecting portion 42*a* can be connected to the connection receiving portion 16*a* of the lock switching mechanism 16 illustrated in FIG. 2. The connecting portion 42*a* includes a plurality of projecting pieces radially projecting outward from the rod 42 in the radial direction, and can transmit the turning force of the rod 42 to the lock switching mechanism 16. Referring to FIGS. 3, 4, and 6, an attachment portion 42*b* to which the connection lever 44 is attached is provided at an end portion on the outer side in the vehicle width direction of the rod 42.

The rod 42 and the support member 41 are provided with a restricting portion 43 for restricting the turning of the rod 42 with respect to the support member 41. The restricting portion 43 includes a flange portion 42*c* and a convex portion 42*d* provided on the rod 42, and a concave groove 41*d* provided on the support member 41.

The flange portion 42*c* comes into contact with an end portion on the inner side in the vehicle width direction of the support member 41 and restricts an insertion position of the rod 42 with respect to the main body portion 41*a*. The convex portion 42*d* protrudes radially outward from the rod 42 and extends to the outer side in the vehicle width direction from the flange portion 42*c*.

The concave groove 41*d* is configured by a notch provided at an end portion on the inner side in the vehicle width direction of the main body portion 41*a* of the support member 41. In the circumferential direction around the axis line C, the angular range in which the concave groove 41*d* is formed is wider than the angular range in which the convex portion 42*d* is formed. A clearance having a defined angular range is formed between a groove wall of the concave groove 41*d* and a side surface of the convex portion 42*d*. The angular range of the clearance is greater than or equal to the turning angle range necessary for the unlock operation of the lock mechanism 14 illustrated in FIG. 2 and is equally formed in the present embodiment.

The connection lever 44 is a conversion member for converting the movement of the wire 27 in the advancing and retracting direction into the turning of the rod 42. The connection lever 44 is provided with an attachment hole 44*a* into which the attachment portion 42*b* can be inserted. The turning of the lever 44 with respect to the attachment portion 42*b* is restricted by, for example, penetration of a coupling pin (not illustrated). Thus, the connection lever 44 is turnable integrally with the rod 42.

The connection lever 44 includes a connecting portion 44*b* for connecting the wire end 28 at the upper end of the wire 27. The connecting portion 44*b* protrudes to the outer side in the radial direction of the rod 42, which is a direction orthogonal to the axis line C. A hole to which the connecting jig 45 can be attached is formed in the connecting portion 44*b*. The wire end 28 is attached to the hole in the 44*b* of the connecting portion via a connecting jig 45 so as not to be easily detached. Note that the connecting jig 45 is also preferably used for the wire connecting portion 36*b* of the cylinder unit 30.

The connection lever 44 configured as described above is turnable from the initial position illustrated in FIGS. 3 and 4 to the operating position turned by an angle defined in a direction D3 (clockwise in FIG. 4) by the unlock operation of the lock mechanism 14 illustrated in FIG. 2.

A spring (second biasing member) 46 that biases the connection lever 44 from the operating position to the initial position is disposed between the connection lever 44 and the support member 41. One end of the spring 46 is locked to the support member 41, and the other end of the spring 46 is locked to the connection lever 44.

Next, the operation of the key cylinder device 20 will be described.

When the key cylinder 32 is turned in the direction D1 by the key operation, the driving lever 35 integrally turns in the direction D1. This causes the driven lever 36 to turn in the direction D2, and this turning causes the wire 27 to be pulled downward (in a first direction). As a result, the connection lever 44 turns in the direction D3, and the rod 42 turns integrally with the connection lever 44 in the direction D3. In this manner, the operating force of the key cylinder 32 is transmitted to the lock switching mechanism 16 illustrated in FIG. 2, whereby the lock mechanism 14 is switched from the locked state to the unlocked state.

When the key operation is stopped, the key cylinder 32 turns from the unlocking position to the initial position by the biasing force of the spring 33. The rod 42 and the connection lever 44 turn from the operating position to the initial position by the biasing force of the spring 46. As a result, the wire 27 is pulled upward (second direction) by the biasing force of the springs 33 and 46.

Here, since both the movement of the wire 27 to the initial position and the turning of the connection lever 44 are upward, a force for moving against gravity is required. The entire length of the cable 25 is long, and the cable 25 may be curved and routed in consideration of other members. As a result, the resistance between the tube 26 and the wire 27 increases, and thus a situation in which the connection lever 44 and the key cylinder 32 including the wire 27 cannot be returned to the initial positions only by the biasing force of the spring 33 disposed in the key cylinder 32 may occur. On the other hand, since the key cylinder device 20 of the present embodiment includes the two springs 33 and 46, the connection lever 44 and the key cylinder 32 including the wire 27 can be reliably returned to the initial positions.

The key cylinder device 20 configured as described above has the following features.

The key cylinder 32 is connected to the door lock device 10 via the wire 27 and the connection unit 40. Therefore, the operating force of the key cylinder 32 can be transmitted to the door lock device 10 via the wire 27. The key cylinder 32 can be disposed at a desired position of the door 1. In the key cylinder 32, a spring 33 that biases the key cylinder 32 from the unlocking position to the initial position is disposed. In the connection unit 40, a spring 46 that biases the wire 27 to move in the second direction is disposed. Therefore, even in a situation in which the resistance between the wire 27 and the tube 26 increases, the key cylinder 32 including the wire 27 can be reliably returned to the initial position.

The connection unit 40 includes a support member 41 attachable to the door 1 of the vehicle and a rod 42 turnably supported by the support member 41 and connectable to the door lock device 10. This allows the key cylinder 32 to be disposed at a desired position of the door 1 and connected to the door lock device 10 without changing the configuration of the door lock device 10. The support member 41 is provided with a restricting portion 43 that restricts the turning of the rod 42 with respect to the support member 41. This allows, when assembling the support member 41 to the door 1, the support member to be assembled in a state where the groove shape of the connection receiving portion 16*a* of the door lock device 10 and the protruding shape of the connecting portion 42*a* of the rod 42 are matched with each other improving workability.

The connection unit 40 has a connection lever 44 that is integrally and turnably attached to the rod 42 and is connected to the upper end of the wire 27. This can connect the key cylinder 32 to the door lock device 10 with a simple configuration, allowing an increase in manufacturing cost to be suppressed.

The key cylinder 32 is disposed at the lower end portion of the door 1 of the vehicle. This causes the key cylinder 32 to be located below the user's eye line and makes it difficult to visually recognize, allowing the designability of the door 1 of the vehicle to be improved.

The connection unit 40 is disposed above the key cylinder 32 at an interval. The cylinder unit 30 includes a spring 33 that returns the key cylinder 32 to the initial position. The connection unit 40 includes a spring 46 that returns the connection lever 44 to the initial position. Thus, the wire 27 and the connection lever 44 can be moved upward against the resistance between the tube 26 and the wire 27 and gravity. Therefore, not only the key cylinder 32 but also the connection lever 44 including the wire 27 can be reliably returned to the initial position against its own weight.

A driven lever 36 which is turnable in conjunction with the turning of the key cylinder 32 and to which a lower end of the wire 27 is connected is provided. This can reliably transmit the operating force of the key cylinder 32 to the wire 27 and reliably unlock the door lock device 10 via the connection lever 44 and the rod 42.

Note that the present invention is not limited to the configuration of the above-described embodiment, and various modifications can be made.

For example, the biasing member that returns the key cylinder 32 including the wire 27 to the initial position is not limited to the two springs 33 and 46, and may be three or more springs or leaf springs, and can be changed as necessary.

The configuration for converting the movement of the wire 27 in the advancing and retracting direction into the turning of the rod 42 is not limited to one connection lever 44, may be configured by a plurality of levers or turning members and can be changed as necessary.

The restricting portion 43 may be configured such that the support member 41 is provided with the convex portion **42*d* and the rod 42 is provided with the concave groove 41*d*. The restricting portion 43 can be changed as necessary as long as the restricting portion 43 can restrict the turning of the rod 42 with respect to the support member 41**.

The turning member that transmits the rotational force of the key cylinder 32 to the wire 27 is not limited to the driven lever 36, and may be configured by the driving lever 35, and can be changed as necessary. The key cylinder 32 may have a configuration of switching the door lock device 10 from the unlocked state to the locked state by turning from the initial position (non-operation position) to the locked position (operation position).

The cylinder unit 30 may be disposed on the upper side of the connection unit 40, or may be disposed spaced apart in the vehicle length direction at the same height position as the connection unit 40.

What is claimed is:

1. A key cylinder device for a vehicle door, the key cylinder device comprising:

a key cylinder that is turnable between an operation position at which a door lock device can be switched to a locked state or an unlocked state and a non-operation position at which the door lock device cannot be switched;

a pulling member that is moved in a first direction by turning of the key cylinder from the non-operation position to the operation position and is moved in a second direction opposite to the first direction by the turning of the key cylinder from the operation position to the non-operation position; and a connecting mechanism for connecting the pulling member to the door lock device; wherein in the key cylinder, a first biasing member that turnably biases the key cylinder from the operation position to the non-operation position is disposed, and in the connecting mechanism, a second biasing member that turnably biases the connecting mechanism so that the pulling member that moves in the second direction is disposed.

2. The key cylinder device for a vehicle door according to claim 1, wherein the connecting mechanism includes:

a support member attachable to the vehicle door; and a connecting member that is attached to the support member so as to be allowed to turn around an axis line and is connectable to the door lock device, and the connecting member and the support member are provided with a restricting portion that restricts turning of the connecting member with respect to the support member.

3. The key cylinder device for a vehicle door according to claim 2, wherein the connecting mechanism includes a connection lever that is integrally and turnably attached to the connecting member, protrudes in a direction intersecting the axis line, and is connected to one end of the pulling member.

4. The key cylinder device for a vehicle door according to claim 3, wherein the key cylinder is disposed at a lower end portion of the vehicle door.

5. The key cylinder device for a vehicle door according to claim 4, wherein the connecting mechanism is disposed above the key cylinder at an interval.

6. The key cylinder device for a vehicle door according to claim 3, comprising a turning member that is turnable in conjunction with the turning of the key cylinder, is connected to the other end of the pulling member, and is for advancing and retreating the pulling member.

7. The key cylinder device for a vehicle door according to claim 2, wherein the key cylinder is disposed at a lower end portion of the vehicle door.

8. The key cylinder device for a vehicle door according to claim 7, wherein the connecting mechanism is disposed above the key cylinder at an interval.

9. The key cylinder device for a vehicle door according to claim 2, comprising a turning member that is turnable in conjunction with the turning of the key cylinder, is connected to the other end of the pulling member, and is for advancing and retreating the pulling member.

10. The key cylinder device for a vehicle door according to claim 1, wherein the key cylinder is disposed at a lower end portion of the vehicle door.

11. The key cylinder device for a vehicle door according to claim 10, wherein the connecting mechanism is disposed above the key cylinder at an interval.

12. The key cylinder device for a vehicle door according to claim 1, comprising a turning member that is turnable in conjunction with the turning of the key cylinder, is connected to the other end of the pulling member, and is for advancing and retreating the pulling member.

* * * * *